N. N. LIBNER.
PLANTER.
APPLICATION FILED OCT. 26, 1910.
986,018.
Patented Mar. 7, 1911.
2 SHEETS—SHEET 1.
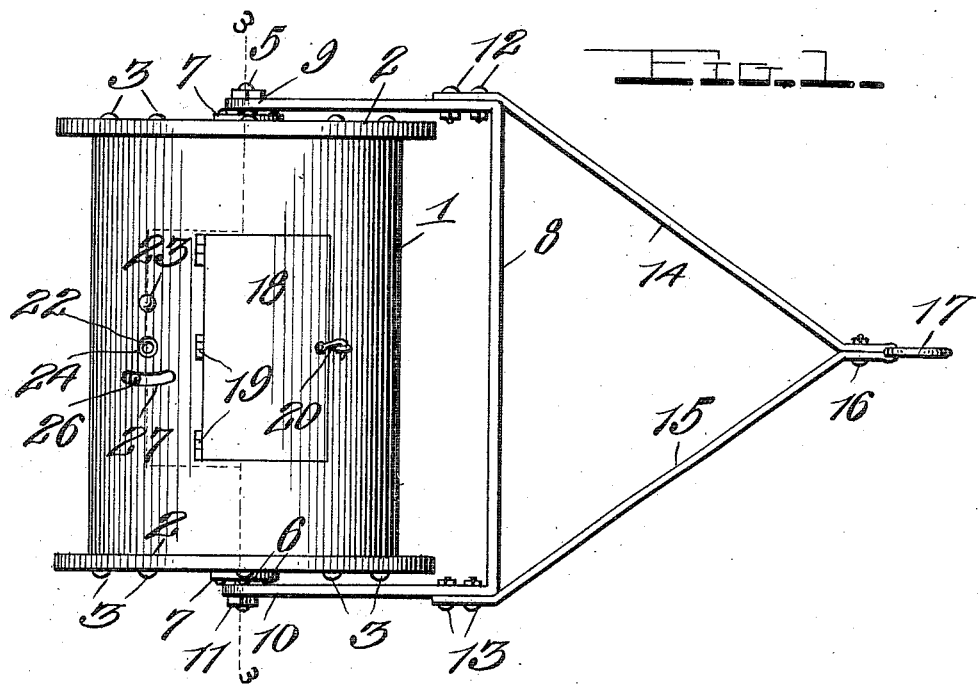
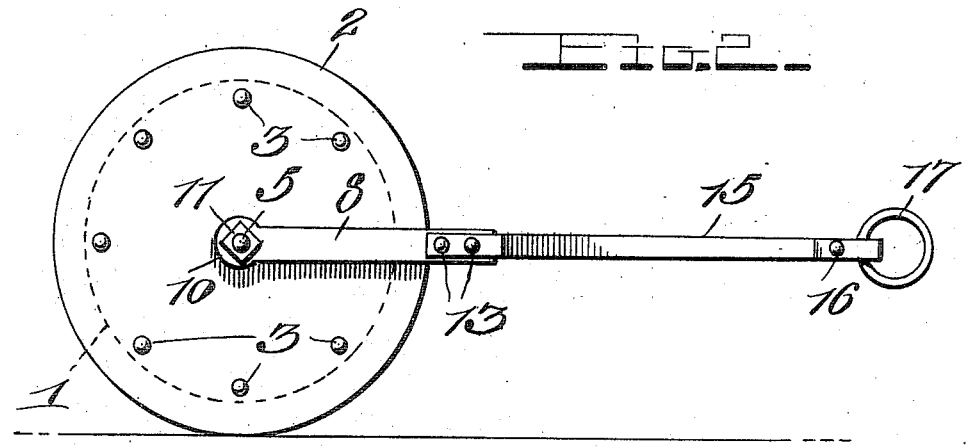
Witnesses
Chas. L. Grieshauer.
H. T. McEnay
Inventor
N. N. Libner,
By Watson E. Coleman,
Attorney N. N. LIBNER.
PLANTER.
APPLICATION FILED OCT. 26, 1910.
986,018.
Patented Mar. 7, 1911.
2 SHEETS—SHEET 2.
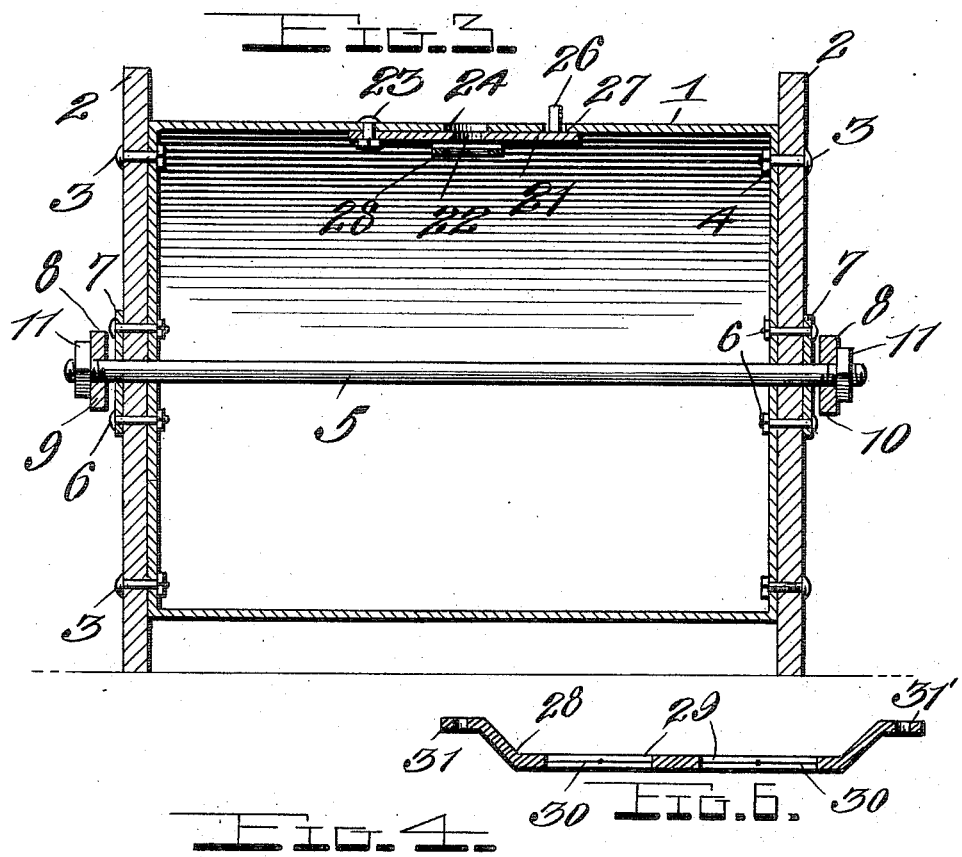
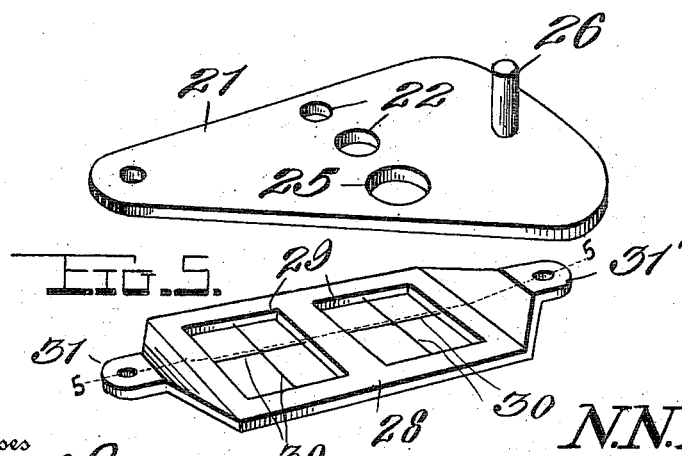
Witnesses
Chas. L. Griebauer.
H. L. McQuay.
Inventor
N. N. Libner,
By Watson E. Coleman,
Attorney

UNITED STATES PATENT OFFICE.

NELS N. LIBNER, OF LUND, SOUTH DAKOTA.

PLANTER.

986,018.   Specification of Letters Patent.   Patented Mar. 7, 1911.

Application filed October 26, 1910. Serial No. 589,174.

*To all whom it may concern:*

Be it known that I, NELS N. LIBNER, a citizen of the United States, residing at Lund, in the county of Lyman and State of South Dakota, have invented certain new and useful Improvements in Planters, of which the following is a specification, reference being had to the accompanying drawings.

This invention relates to new and useful improvements in seed planters and has for its object to provide a device adapted to plant the seed simultaneously and at regular intervals so that the rows will be of an equal distance apart.

Another object is to provide a seed receptacle of novel construction and novel regulating means for the same whereby different varieties and sizes of seeds may be sown. such as field corn, pop corn, cane seed, etc.

With these and other objects in view the invention consists in the features of construction hereinafter described, pointed out in the claims, and shown in the accompanying drawings, in which:

Figure 1 is a plan view. Fig. 2 is a side elevation. Fig. 3 is a sectional view taken on the line 3—3 of Fig. 1. Fig. 4 is a detail perspective of the regulator. Fig. 5 is a detail perspective of the guiding frame. Fig. 6 is a sectional view taken on the line 5—5 of Fig. 5.

Referring to the drawings by numerals of reference, 1 indicates a hollow cylindrical seed box which may be made of any desired material, said box being mounted upon two solid wooden wheels 2 and securely fastened thereto by means of bolts 3 passing through the wheels and fastened on the inside of the box 1 by nuts 4. The wheels 2 being rotatably mounted on an axle 5 which extends through the entire length of the box 1. Rigidly mounted to the outside of the wheels 2 by means of the bolts 6 are two iron plates 7 which serve as a boxing for the axle 5.

Secured upon the axle 5 is a U-shaped frame 8, having its ends enlarged and two holes 9 and 10 drilled therein, said ends being fitted securely upon the axle, a screw threaded nut 11 is provided to be fastened on the end of the axle to keep the ends of the frame from slipping off.

Extending outwardly from each corner of the frame 8, and being fastened thereto by means of bolts 12 and 13 are two rods 14 and 15 having their outer ends brought together and fastened by a bolt 16.

A ring 17 is arranged between the outer ends of rods 14 and 15 and fastened by the bolt 16, said ring being used to fasten the whiffletree to the planter. A door 18 is provided on the box 1 whereby access to the interior may be readily had, said door having one side secured to the box by means of the hinges 19, or other suitable means. A locking means 20 secured at the other side whereby the door is held in a closed position during the rotation of the box. A regulation plate 21 is provided within the box 1, said plate being substantially circular at one end and provided with a series of openings 22 cut therein for the regulation of the sowing of the various sizes of grain, said plate continued at its other end into an arm and pivotally mounted to the inner face of the body by means of a bolt 23. A hole 24 is cut in the box 1 of sufficient diameter to register with the largest one of the holes 25 so that any size grain may be sown. The flow of the grain is regulated by sliding the plate 22 from one hole to another by means of a handle 26 fastened to the circular end of the plate and working in a slot 27 cut in the box 1.

A guiding frame 28 is provided within the seed box 1, said frame having two rectangular openings 29, a number of wires 30 are stretched across said openings in opposite directions so that the grain will be made to flow more evenly. The ends of the frame 28 continued into arms 31 and 31', said arms being bent outwardly and fastened on the inside of the box by rivets or other suitable means. The frame 28 is placed within the seed box over the regulating plate where the grain passes out so that the flow of the grain will be more evenly regulated.

It will be seen that the invention is extremely simple in construction. The novel arrangement of its parts renders the device effective and easily operated.

I will be obvious that various changes in the details of construction and in the proportions may be resorted to for successfully carrying the invention into practice without sacrificing any of the novel features or departing from the scope thereof.

Having thus fully described my invention, what I claim as new, and desire to secure by Letters Patent is:—

1. A seed planter comprising a frame, an axle supporting the frame, wheels revolubly mounted on the axle, a cylindrical seed receptacle removably secured to the wheels and having the axle passing therethrough, and an apertured plate pivotally mounted within the receptacle and arranged so that the perforations in the plate register with an opening in the receptacle.

2. A seed planter comprising a revolubly mounted cylindrical receptacle having an opening for the reception of seed, a plate pivotally mounted at one end within the seed receptacle and provided with apertures of different sizes arranged to register with a feed opening in the receptacle, and means for holding the free end of the plate in adjusted position.

3. A seed planter comprising a frame, an axle supporting the frame, wheels revolubly mounted on the axle, a cylindrical seed box removably secured to the wheels and having the axle passing therethrough, a plate provided with apertures of various sizes and pivotally mounted at one end within the box and arranged so that the apertures therein are adapted to register with a feed opening in the box, and means for holding the free end of said plate in adjusted position.

4. A seed planter comprising a revolubly mounted seed box provided with an opening for the reception of the seed, and a feed opening, a pear-shaped plate arranged within the box and having its smaller end pivotally mounted and its larger end provided with a series of openings of different sizes arranged to register with a feed opening in the box, and means for holding the free end of the plate in adjusted position.

5. A seed planter comprising a revolubly mounted cylindrical seed receptacle having an opening for the reception of seed, a plate pivotally mounted at one end within the seed receptacle and provided with apertures of various sizes arranged to register with a feed opening in the receptacle, a guiding frame arranged over said plate, and having its ends fastened securely to the inside of the receptacle, said frame having two rectangular openings therein, wires stretched across said openings in opposite directions, so that the flow of grain will be evenly regulated.

In testimony whereof I hereunto affix my signature in the presence of two witnesses.

NELS N. LIBNER.

Witnesses:
J. S. SMITH,
W. J. SLITER.

Copies of this patent may be obtained for five cents each, by addressing the "Commissioner of Patents, Washington, D. C."